US012811348B2

(12) United States Patent
Liu et al.

(10) Patent No.: US 12,811,348 B2
(45) Date of Patent: Nov. 24, 2026

(54) GUIDE PIN FOR BLANK COVER DETECTION

(71) Applicant: Cisco Technology, Inc., San Jose, CA (US)

(72) Inventors: Pei Liu, Shanghai (CN); Siyuan Yang, Shanghai (CN); Lifeng Pan, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 447 days.

(21) Appl. No.: 18/586,302

(22) Filed: Feb. 23, 2024

(65) Prior Publication Data

US 2025/0273912 A1 Aug. 28, 2025

(51) Int. Cl.

| | |
|---|---|
| ***H01R 13/66*** | (2006.01) |
| ***H01R 12/73*** | (2011.01) |
| ***H01R 13/447*** | (2006.01) |
| ***H01R 13/508*** | (2006.01) |
| ***H01R 13/512*** | (2006.01) |
| ***H01R 13/629*** | (2006.01) |

(52) U.S. Cl.

CPC ....... *H01R 13/6683* (2013.01); *H01R 12/737* (2013.01); *H01R 13/447* (2013.01); *H01R 13/508* (2013.01); *H01R 13/512* (2013.01); *H01R 13/629* (2013.01)

(58) Field of Classification Search

CPC .............. H01R 13/6683; H01R 12/737; H01R 13/447; H01R 13/508; H01R 13/512; H01R 13/629

See application file for complete search history.

(56) References Cited

U.S. PATENT DOCUMENTS

| | | | | |
|---|---|---|---|---|
| 4,927,382 | A * | 5/1990 | Huber | H01R 13/641 340/687 |
| 6,447,317 | B1 | 9/2002 | Billman | |
| 6,582,241 | B1 * | 6/2003 | Lutz, Jr. | H01R 12/7005 439/157 |
| 8,328,571 | B2 * | 12/2012 | Mulfinger | G06F 1/185 439/260 |
| 9,160,088 | B2 * | 10/2015 | Rossman | H05K 7/1454 |
| 2008/0025292 | A1 | 1/2008 | King et al. | |
| 2009/0068861 | A1 * | 3/2009 | Ikeda | H01R 43/26 439/68 |
| 2012/0008285 | A1 | 1/2012 | Renkel, Jr. et al. | |
| 2018/0014424 | A1 | 1/2018 | Costello | |
| 2021/0136939 | A1 | 5/2021 | Madsen et al. | |

* cited by examiner

*Primary Examiner* — Travis S Chambers

(74) *Attorney, Agent, or Firm* — Patterson + Sheridan, LLP

(57) ABSTRACT

The present disclosure describes a supervisor card that uses guide pins on the backplane connectors in a chassis to determine whether covers are inserted in slots in the chassis. A system includes a backplane connector, a guide pin, a cover, and a processor. The backplane connector is positioned in a slot on a chassis. The guide pin is coupled to the backplane connector. The cover includes a metal clip that engages the guide pin when the cover is inserted into the slot. The processor is electrically coupled to the guide pin and applies a voltage to the guide pin. The processor also determines that the cover is inserted into the slot based on a change in voltage or current in the guide pin.

20 Claims, 13 Drawing Sheets

GUIDE PIN FOR BLANK COVER DETECTION

TECHNICAL FIELD

Embodiments presented in this disclosure generally relate to hardware racks. More specifically, embodiments disclosed herein a guide pin used to detect blank covers in hardware racks.

BACKGROUND

Hardware racks may be used to hold hardware devices (e.g., in a datacenter or server room). For example, a hardware rack may hold line cards, supervisor cards, etc. in slots in a chassis of the rack. When a slot in the chassis is not being used, a cover (which may be referred to as a blank cover) may be inserted into the slot to improve thermal performance and to protect other hardware devices in the chassis. In existing systems, the supervisor cards may detect when the cover is inserted in the slot using a Hall detector positioned on the chassis and near the cover. The Hall detector, however, occupies additional space in the rack and increases the complexity of the design.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
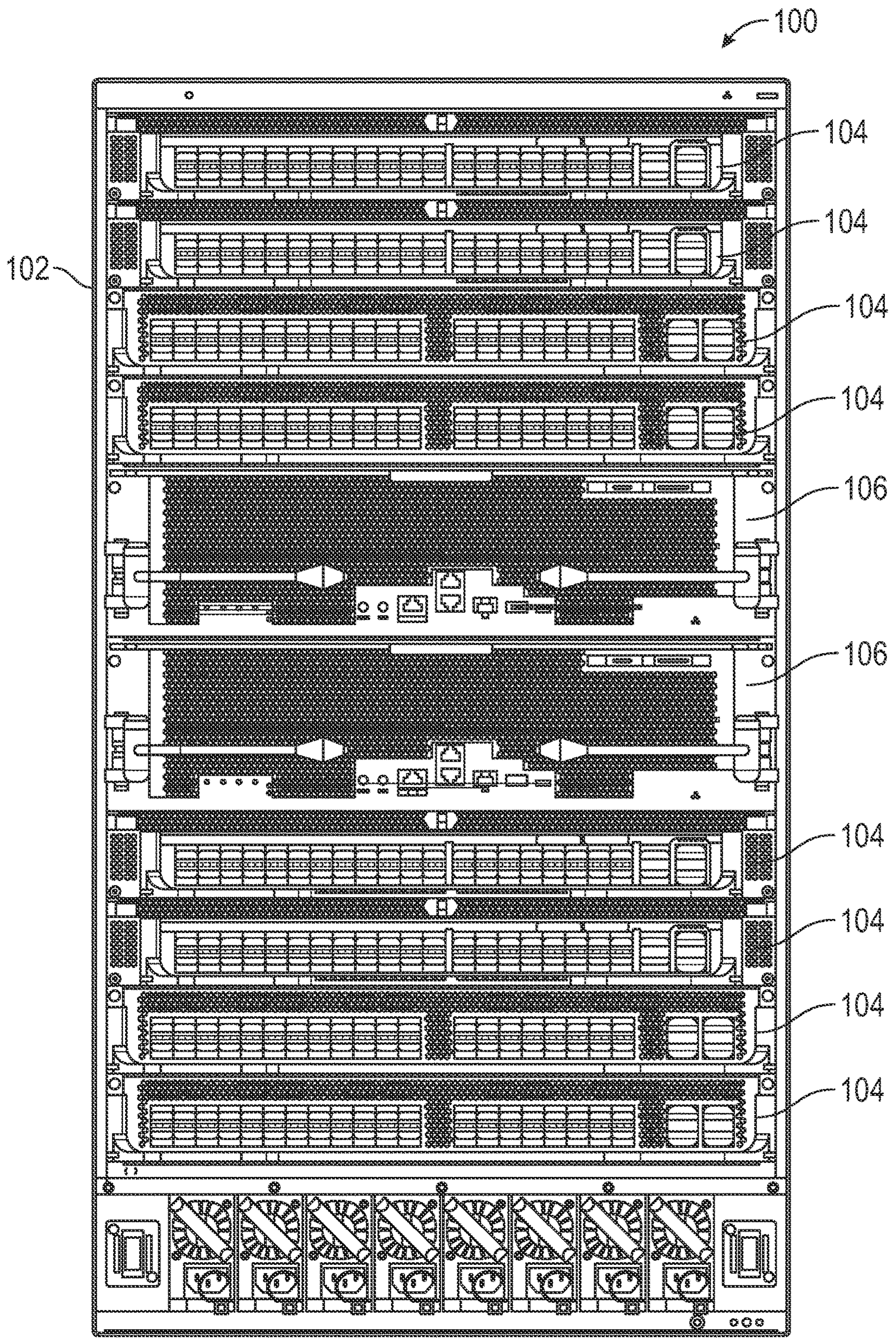
FIG. 1A illustrates an example system.

The present disclosure describes a supervisor card that uses guide pins on the backplane connectors in a chassis to determine whether covers are inserted in slots in the chassis. According to an embodiment, a system includes a backplane connector, a guide pin, a cover, and a processor. The backplane connector is positioned in a slot on a chassis. The guide pin is coupled to the backplane connector. The cover includes a metal clip that engages the guide pin when the cover is inserted into the slot. The processor is electrically coupled to the guide pin and applies a voltage to the guide pin. The processor also determines that the cover is inserted into the slot based on a change in voltage or current in the guide pin.

According to another embodiment, a method includes applying a voltage to a guide pin coupled to a backplane connector positioned in a slot on a chassis. The method also includes determining that a cover comprising a metal clip is inserted into the slot based on a change in voltage or current in the guide pin. The metal clip engages the guide pin when the cover is inserted into the slot.

According to another embodiment, a system includes a first guide pin, a second guide pin, a cover, a line card, and a processor. The first guide pin is positioned in a first slot on a chassis. The second guide pin us positioned in a second slot on the chassis. The cover includes a metal clip. The cover is inserted into the first slot such that the metal clip engages the first guide pin. The line card includes a plastic connector. The line card is inserted into the second slot such that the plastic connector engages the second guide pin. The processor is electrically coupled to the first guide pin and the second guide pin. The processor applies a voltage to the first guide pin and the second guide pin and determines that the cover is inserted into the first slot rather than the second slot based on a change in voltage or current in the guide pin.

Example Embodiments

The present disclosure describes a supervisor card that uses guide pins in a chassis to determine whether covers are inserted in slots in the chassis. For example, the supervisor card may apply an electric voltage to the guide pins on the backplane connectors in the chassis. A cover may include a metal clip that engages a guide pin when the cover is inserted in a slot. The metal clip causes a change in voltage or current in the guide pin. For example, the metal clip may pull the guide pin to electrical ground and cause an electric current to flow through the guide pin. When the supervisor card detects the change in voltage or current, the supervisor card may determine that a cover is inserted in the slot. If, on the other hand, a line card were inserted in the slot, the line card may not include the metal clip that engages the guide pin. As a result, when the line card is inserted in the slot, the line card may not pull the guide pin to electrical ground. The supervisor card may determine that the cover is not inserted in the slot when the supervisor card detects that the guide pin has not been pulled to electrical ground.

In certain embodiments, the supervisor card and chassis provide several technical advantages. For example, by using the guide pins to determine whether covers are inserted into slots in the chassis, the amount of real estate in the chassis occupied by hardware is reduced relative to existing systems that use Hall detectors. As another example, by using the guide pins, the complexity and cost of designs is reduced relative to existing systems that use Hall detectors.

FIG. 1A illustrates an example system 100. The system 100 may be a hardware rack (e.g., in a data center or server room). As seen in FIG. 1A, the system 100 includes a chassis 102. The chassis 102 may be a structure (e.g., metal structure, plastic structure, wood structure, etc.) that holds or houses multiple hardware devices. The chassis 102 may hold or house hardware devices in any configuration. In the example of FIG. 1A, the chassis 102 holds or houses multiple hardware devices arranged vertically in the chassis 102.

The chassis 102 may store or house any type of hardware device. Typically, the hardware devices may be arranged on one or more line cards 104 that are inserted and secured to the chassis 102. Each of the line cards 104 may include a different hardware device that performs a different function. The chassis 102 may also store or hold one or more supervisor cards 106. The supervisor cards 106 may include hardware devices that monitor or control the line cards 104. In the example of FIG. 1A, the chassis 102 holds or houses eight line cards 104 and two supervisor cards 106. The line cards 104 may be electrically and communicatively connected to the supervisor cards 106 by backplane connectors positioned in the chassis 102. When the line cards 104 and the supervisor cards 106 are positioned into slots in the chassis 102, the line cards 104 and the supervisor cards 106 may physically connect to the backplane connectors in the chassis 102. These backplane connectors may then connect the line cards 104 and the supervisor cards 106.

When a slot is unused (e.g., when no line card 104 or supervisor card 106 is positioned in the slot), a cover may instead be positioned in the slot to improve thermal performance and to protect other components in the chassis 102 (e.g., other line cards 104 or supervisor cards 106). The backplane connectors may include a metal (e.g., iron) guide pin that extends from the backplane connector. The guide pin may assist in aligning the line cards 104 and the supervisor cards 106 with their respective backplane connectors. In certain embodiments, the supervisor cards 106 apply an electric voltage to the guide pins in the backplane connectors. When a cover is positioned in a slot, the cover may cause a change in voltage or current in the in the guide pin for that slot (e.g., pull the guide pin to electrical ground). When a line card 104 or supervisor card 106 is positioned in the slot, the guide pin may not be pulled to electrical ground. The supervisor cards 106 may monitor the voltages or currents across the guide pins to determine whether covers are inserted into the slots in the chassis 102.

Figure 1B:
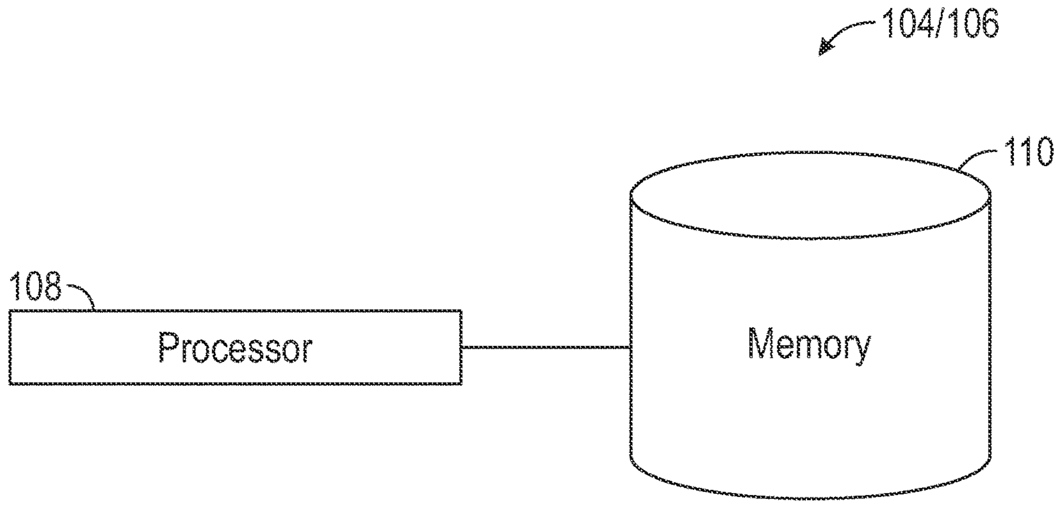
FIG. 1B illustrates components of an example supervisor card in the system of FIG. 1A.

FIG. 1B illustrates an example line card 104 and/or supervisor card 106 in the system 100 of FIG. 1A. As discussed previously, the line card 104 and the supervisor card 106 may be positioned in slots in the chassis 102. As seen in FIG. 1B, the line card 104 and/or the supervisor card 106 may include a processor 108 and a memory 110 that perform any of the functions of the line card 104 and/or the supervisor card 106 described herein. Each line card 104 and each supervisor card 106 in the chassis 102 may include a processor 108 and a memory 110.

The processor 108 is any electronic circuitry, including, but not limited to one or a combination of microprocessors, microcontrollers, application specific integrated circuits (ASIC), application specific instruction set processor (ASIP), and/or state machines, that communicatively couples to the memory 110 and controls the operation of the line card 104 and/or the supervisor card 106. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the line card 104 and/or the supervisor card 106*by* processing information (e.g., information received from the line cards 104, supervisor cards 106, and memory 110). The processor 108 is not limited to a single processing device and may encompass multiple processing devices contained in the same device or computer or distributed across multiple devices or computers. The processor 108 is considered to perform a set of functions or actions if the multiple processing devices collectively perform the set of functions or actions, even if different processing devices perform different functions or actions in the set.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein. The memory 110 is not limited to a single memory and may encompass multiple memories contained in the same device or computer or distributed across multiple devices or computers. The memory 110 is considered to store a set of data, operational software, or information if the multiple memories collectively store the set of data, operational software, or information, even if different memories store different portions of the data, operational software, or information in the set.

FIGS. 2A through 2F illustrate example covers 202 and 220 and portions of the cover 202 and 220 in the system 100 of FIG. 1A. Generally, when a slot in the chassis 102 is not holding or housing a hardware device (e.g., a line card 104 or a supervisor card 106), a cover 202 or 220 is instead inserted into the slot. The cover 202 or 220 may be a metallic tray that occupies the empty slot. In certain embodiments, the cover 202 or 220 improves thermal performance and protects other hardware devices in the chassis 102.

To understand how to control and manage the devices in the chassis 102, the supervisor cards 106 may need to know which slots are occupied by covers 202 or 220. In existing systems, a Hall detector may be positioned on the chassis and near the cover to detect when the cover is inserted in the slot. The Hall detector, however, occupies additional space in the chassis, and increasing the complexity of the design. The present disclosure describes a cover 202 or 220 that includes a metal clip that engages the guide pin of a backplane connector when the cover 202 or 220 is inserted into a slot in the chassis 102. The metal clip may cause a change in voltage or current in the guide pin (e.g., pull the guide pin to electrical ground). Because the supervisor card 106 is applying an electrical voltage to the guide pin, the metal clip may complete a circuit and cause an electric signal or current to flow through the guide pin. When the supervisor card 106 detects the change in voltage or current in the guide pin, the supervisor card 106 may determine that the cover 202 or 220 is inserted into the slot in the chassis 102. For example, the supervisor card 106 may monitor the voltage across the guide pin to determine when the guide pin has been pulled to electrical ground. Alternatively or additionally, the supervisor card 106 may monitor the electrical signals or currents flowing through the guide pin. When the supervisor card 106 detects an electrical signal or current flowing through the guide pin, the supervisor card 106 may determine that the cover 202 or 220 is inserted into the slot in the chassis 102.

When a line card 104 is inserted into the slot, a plastic mating component may engage the guide pin. The plastic mating component may not complete the circuit, and thus, the supervisor card 106 may not detect a change in voltage or current in the guide pin. In response, the supervisor card 106 may determine that a cover 202 or 220 is not inserted into the slot in the chassis 102. In some embodiments, when the line card 104 is inserted into the slot in the chassis 102, the line card 104 causes an electric signal to flow through another pin (e.g., an electrical pin on a backplane of the chassis 102). When the supervisor card 106 detects this electric signal (and/or no electric signal flowing through the guide pin), the supervisor card 106 may determine that the line card 104 is inserted into the slot.

Figure 2A:
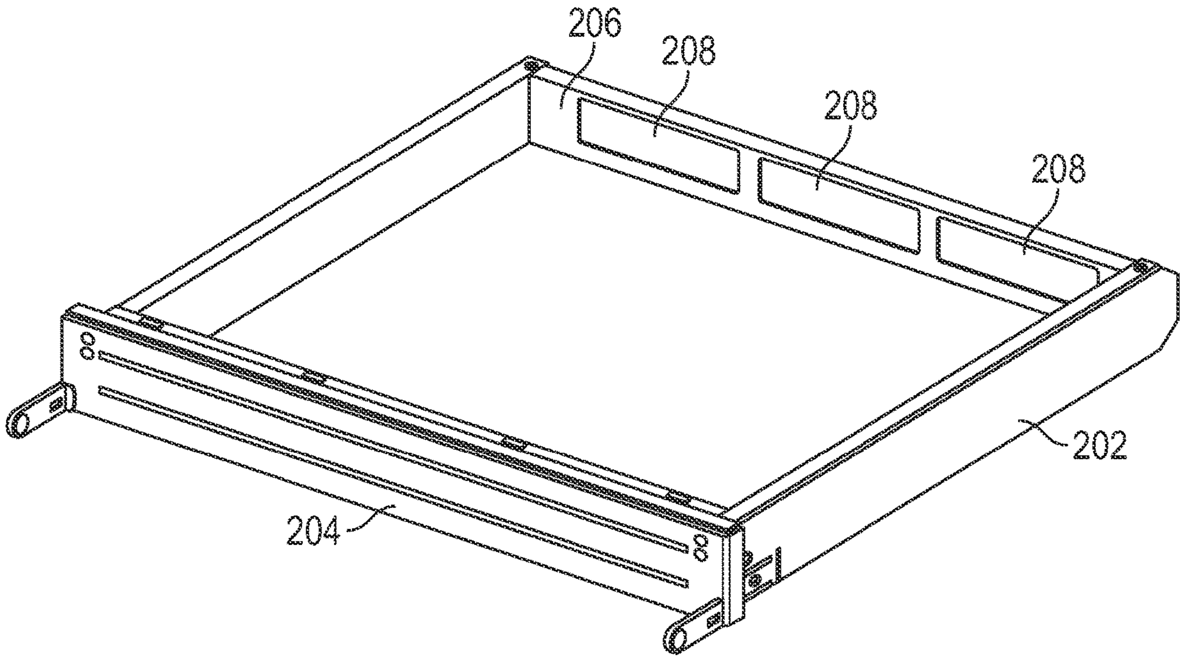
FIG. 2A through 2F illustrate example covers and portions of the covers in the system of FIG. 1A.

FIG. 2A illustrates an example cover 202. As seen in FIG. 2A, the cover 202 may be a metallic tray that fits within a slot in the chassis 102. The cover 202 includes a front side 204 and a backside 206. The backside 206 of the cover 202 may first be inserted through a front side of a slot in the chassis 102. The backside 206 may then be pushed towards a backside of the slot in the chassis 102. When the cover 202 is positioned in the slot, the backside 206 of the cover 202 is positioned near the backside of the chassis 102 and the front side 204 is positioned near the front side of the chassis 102. The backplane connector for the slot may also be positioned on the backside of the chassis. As a result, the backside 206 of the cover 202 is positioned near the backplane connector for the slot when the cover 202 is positioned in the slot.

Additionally, as seen in FIG. 2A, the cover 202 defines multiple cavities 208 in the backside 206. The cavities 208 may provide improved airflow through the cover 202. The backside 206 may define any number of cavities 208. In the example of FIG. 2A, the backside 206 defines a single row of cavities 208. Due to the height of the cover 202, the cover 202 may be suitable for slots that are sized to hold or house line cards 104.

Figure 2B:
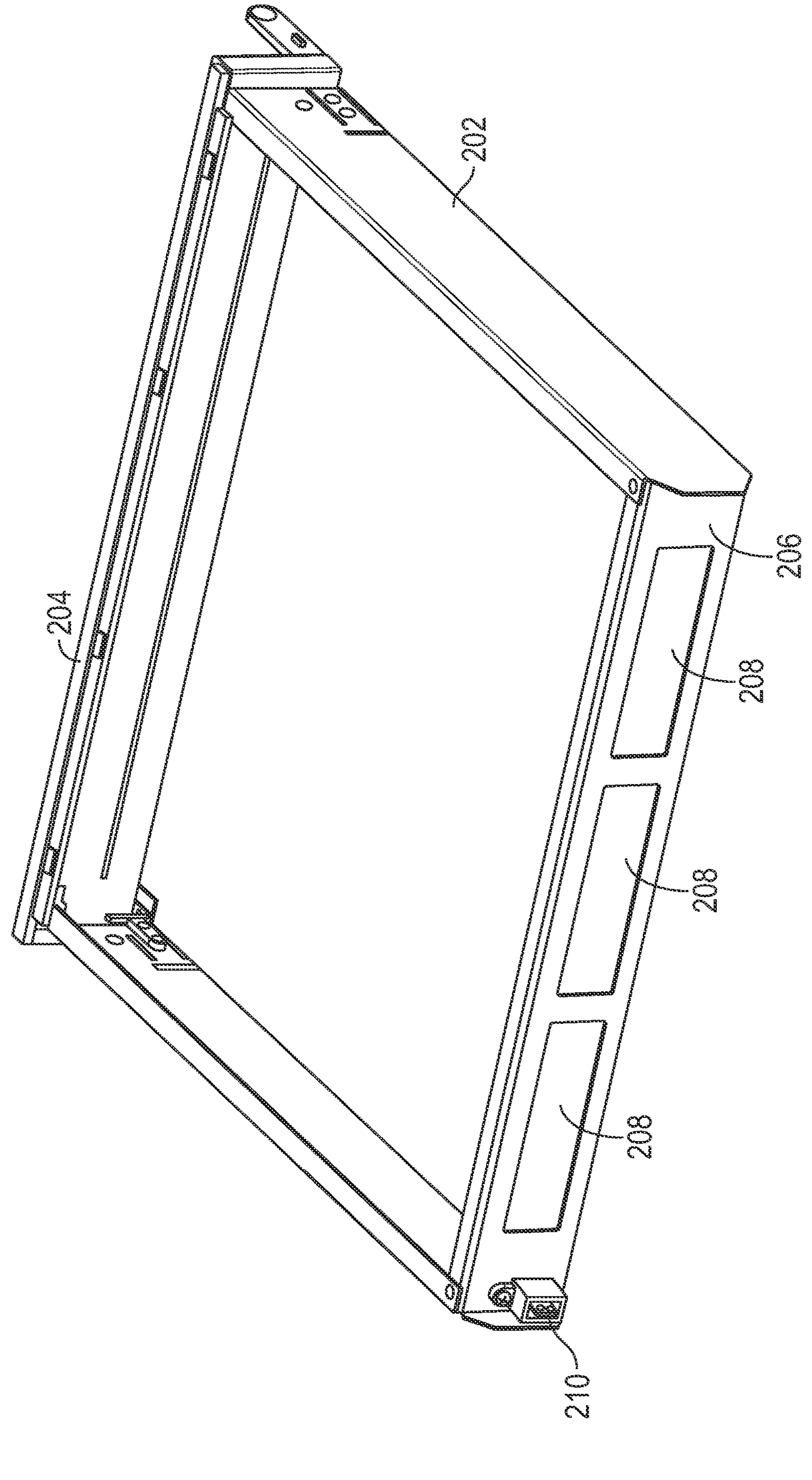

FIG. 2B illustrates another perspective of the cover 202. As seen in FIG. 2B, the cover 202 includes the front side 204 and the backside 206 opposite the front side 204. The backside 206 also defines the cavities 208. Additionally, a metal clip 210 is positioned on the backside 206. As discussed previously, when the cover 202 is positioned in the slot of the chassis 102, the clip 210 may engage a guide pin of the backplane connector for the slot. The clip 210 may cause a change in voltage or current in the guide pin (e.g., pull the guide pin to electrical ground). Because a supervisor card 106 may apply an electrical voltage to the guide pin, the clip 210 may cause an electrical signal or current to flow through the guide pin when the clip 210 engages the guide pin. The supervisor card 106 may detect the change in voltage or current in the guide pin to determine that the cover 202 (rather than a line card) is positioned in the slot.

Figure 2D:
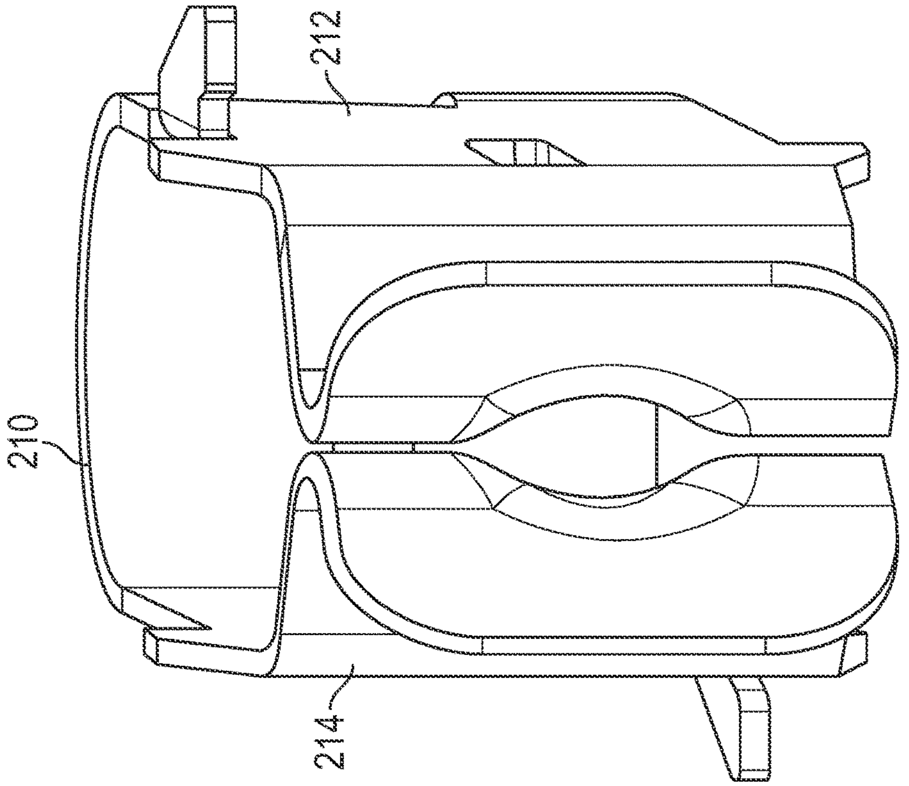
Figure 2C:
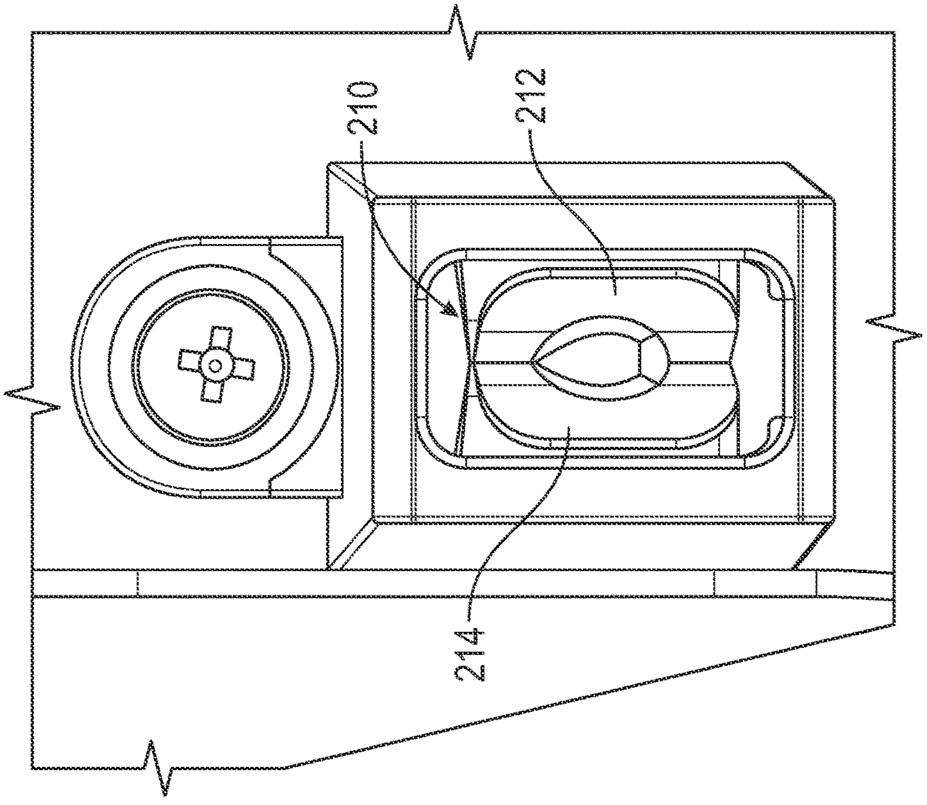

FIG. 2C illustrates the clip 210. As seen in FIG. 2C, the clip 210 may be secured to the backside of 206 of the cover 202. The clip 210 may include arms 212 and 214. The arms 212 and 214 may open and close around a guide pin of a backplane connector to engage the guide pin. Additionally, the arms 214 and 212 may pull the guide pin to electrical ground, which may cause an electric signal or current to flow through the guide pin.

FIG. 2D illustrates another perspective of the clip 210. As seen in FIG. 2D, the clip 210 includes the arms 212 and 214. The arms 212 and 214 may be connected or joined together at one end of the arms 212 and 214. The other end of the arms 212 and 214 may open or close around a guide pin to engage the guide pin.

Figure 2E:
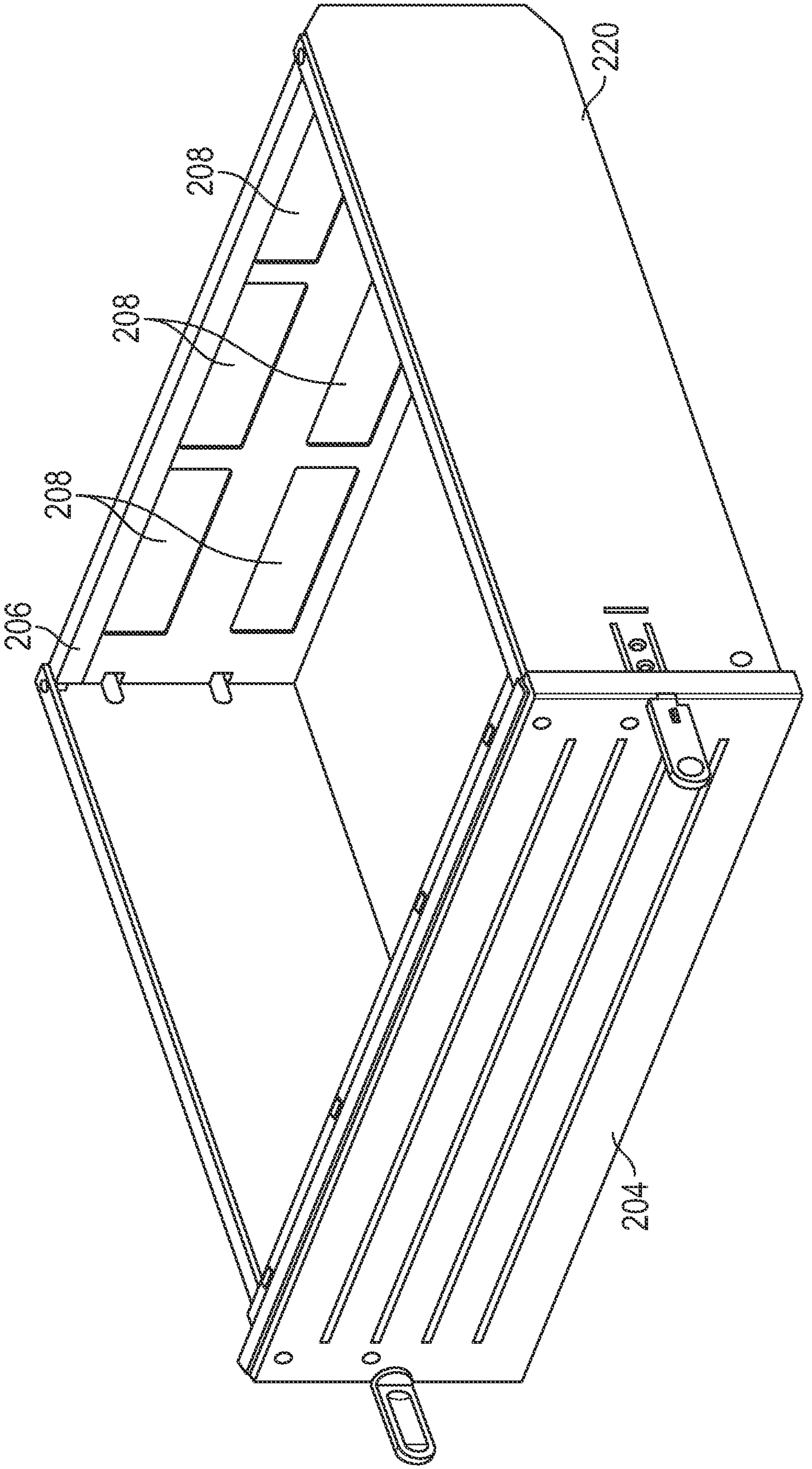

FIG. 2E illustrates a cover 220. As seen in FIG. 2E, the cover 220 may be larger than the cover 202. As a result, the cover 220 may be designed for a large slot in the chassis 102. For example, the cover 202 may be designed for a slot that holds a line card 104, while the cover 220 is designed for a slot that holds a supervisor card 106.

The cover 220 includes the front side 204 and the backside 206 opposite the front side 204. Additionally, the backside 206 defines multiple cavities 208. As seen in FIG. 2E, the backside 206 defines an additional row of cavities 208 relative to the cover 202. The cover 220 may be inserted into a slot in the chassis 102 by first inserting the backside 206 into the slot through the front side of the slot. The backside 206 may then be pushed towards the backside of the slot. When the cover 220 is positioned in the slot, the backside 206 may be positioned near the backside of the chassis 102. Additionally, the front side 204 may be positioned near the front side of the chassis 102.

Figure 2F:
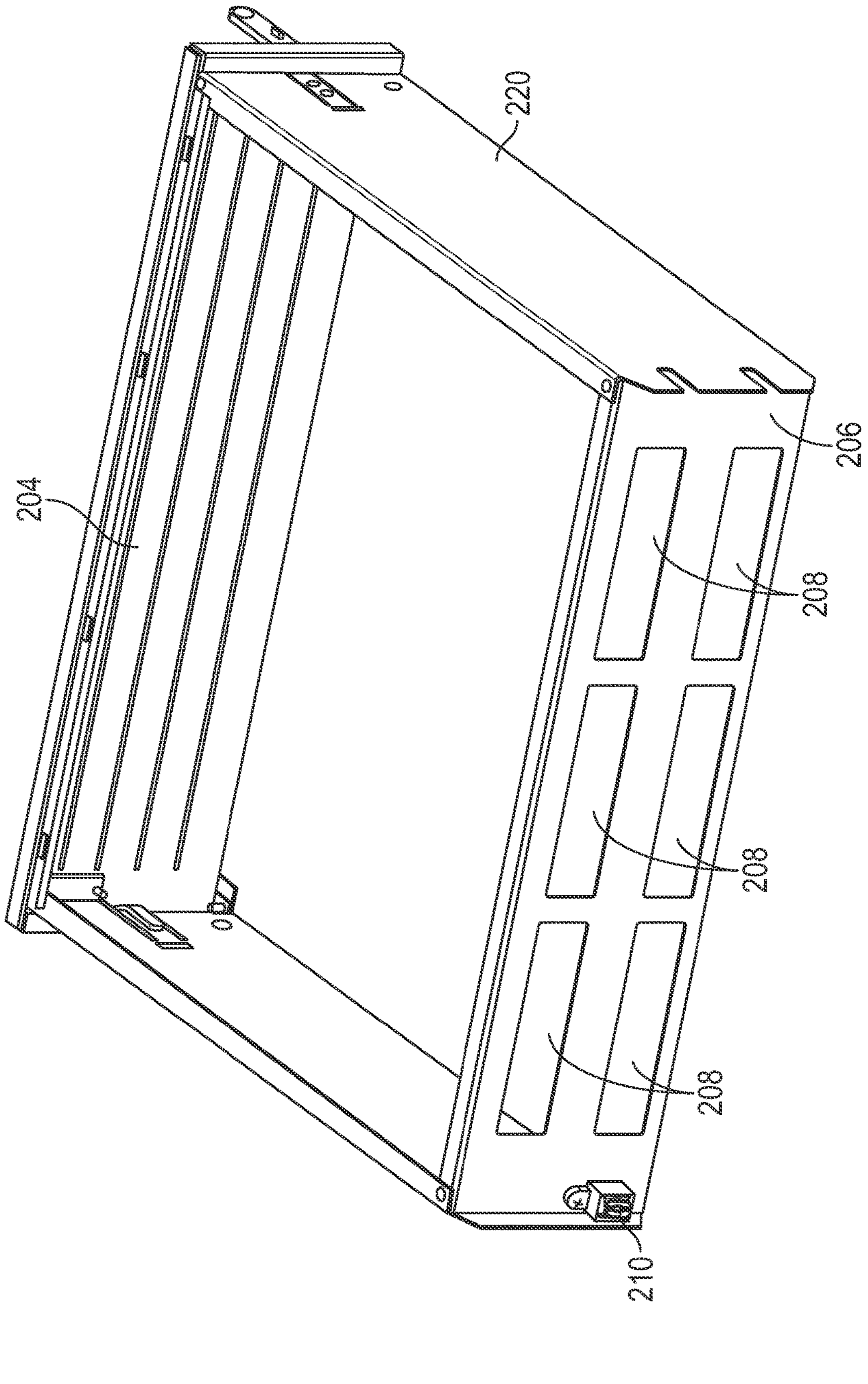

FIG. 2F illustrates another perspective of the cover 220. As seen in FIG. 2F, the cover 220 includes the front side 204 and the backside 206 opposite the front side 204. The backside 206 defines multiple rows of cavities 208. Additionally, the clip 210 is attached to the backside 206. The clip 210 may engage a guide pin of a backplane connector for a slot when the cover 220 is positioned in the slot. The cover 220 may cause a change in voltage or current in the guide pin. For example, the cover 220 may pull the guide pin to electrical ground, which causes an electric signal or current to flow through the guide pin. A supervisor card 106 in the chassis 102 may determine that the cover 220 (rather than a supervisor card) is positioned in the slot when the supervisor card 106 detects that the guide pin has been pulled to electrical ground.

Figure 3:
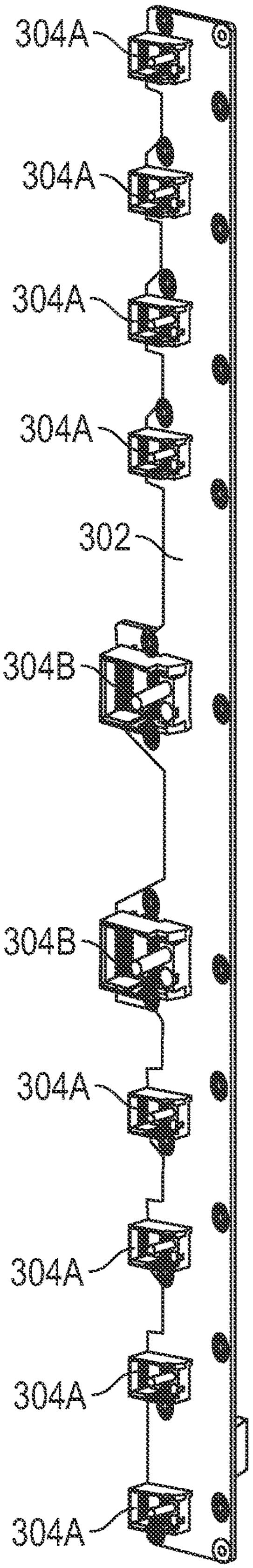
FIG. 3 illustrates an example portion of the system of FIG. 1A.

FIG. 3 illustrates an example portion of the system 100 of FIG. 1A. As seen in FIG. 3, the system 100 includes a printed circuit board 302. Multiple backplane connectors 304 are attached to the printed circuit board 302. The printed circuit board 302 may include electrical connections that electrically connect the backplane connectors 304 to each other. The printed circuit board 302 may be positioned along a backside of the chassis 102. The printed circuit board 302 may be positioned such that each backplane connector 304 is positioned in a slot of the chassis 102. When a hardware device (e.g., line card 104 or supervisor card 106) or cover 202 or 220 is inserted into the slot, the hardware device or cover 202 or 220 may engage the backplane connector 304 for that slot.

As seen in FIG. 3, the printed circuit board 302 includes four backplane connectors 304A arranged in an upper portion of the printed circuit board 302. The printed circuit board 302 also includes two backplane connectors 304B arranged in a middle portion of the printed circuit board 302 (e.g., between the upper and lower portions). Additionally, the printed circuit board 302 includes four backplane connectors 304A arranged in a lower portion of the printed circuit board 302. The four backplane connectors 304A arranged in the upper portion of the printed circuit board 302 and the four backplane connectors 304A arranged in the lower portion of the printed circuit board 302 may be positioned in slots that accommodate line cards 104. When the line cards 104 are positioned in these slots, the line cards 104 may connect to these backplane connectors 304A. The backplane connectors 304B positioned in the middle portion of the printed circuit board 302 may be positioned in slots that accommodate supervisor cards 106. When supervisor cards 106 are positioned in the slots, the supervisor cards 106 connect to these backplane connectors 304B.

Figure 4A:
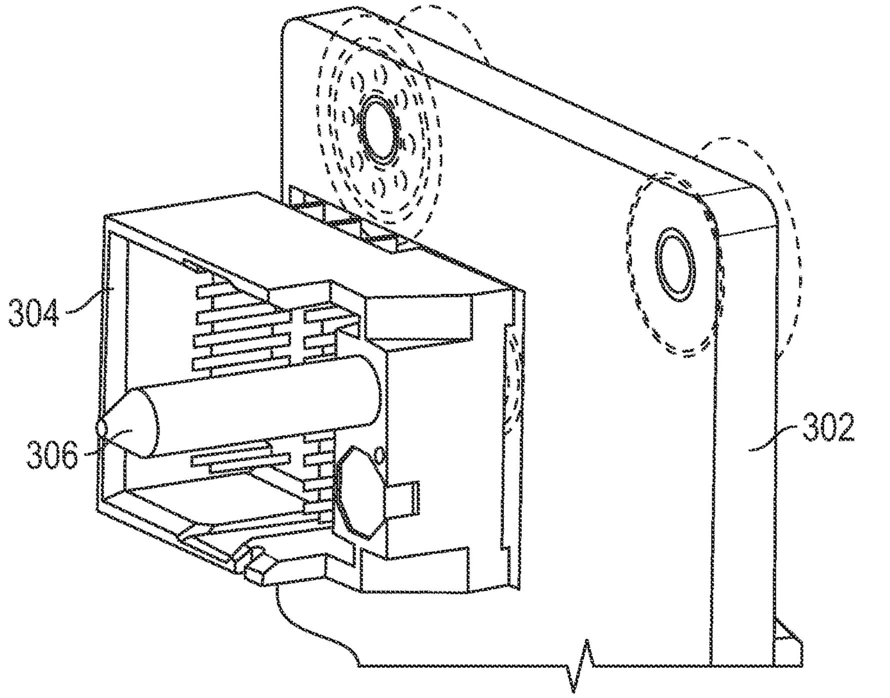
FIGS. 4A through 4D illustrate example portions of the system of FIG. 1A.
Figure 4B:
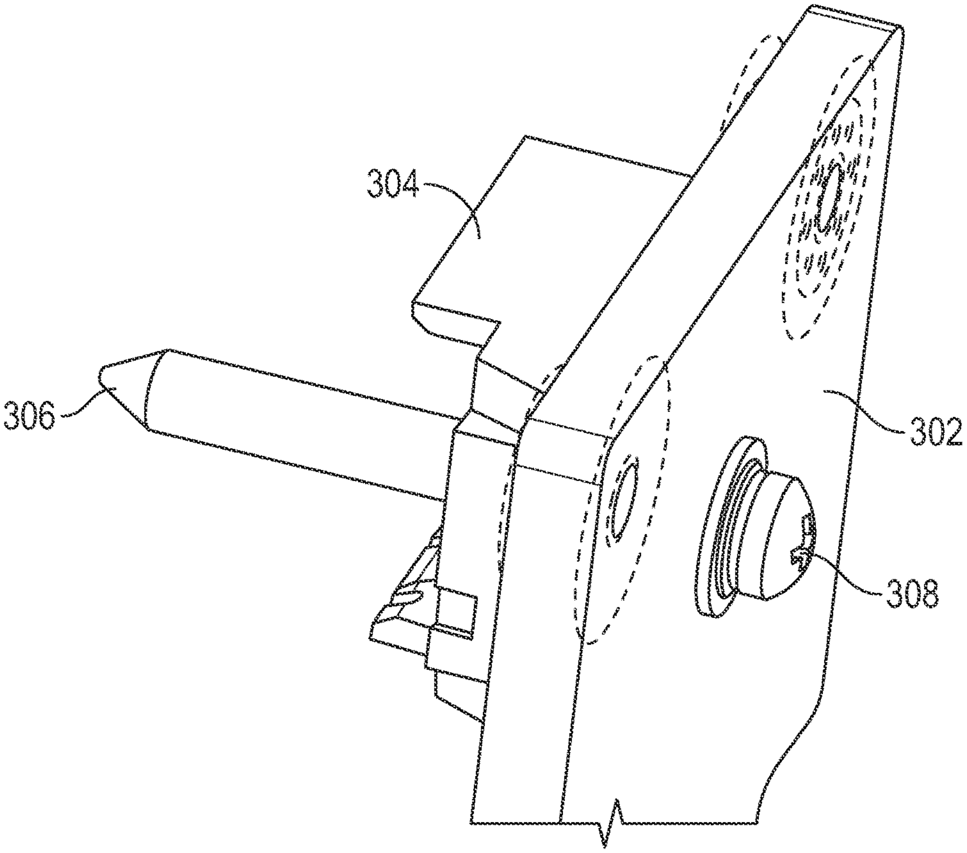
Figure 4C:
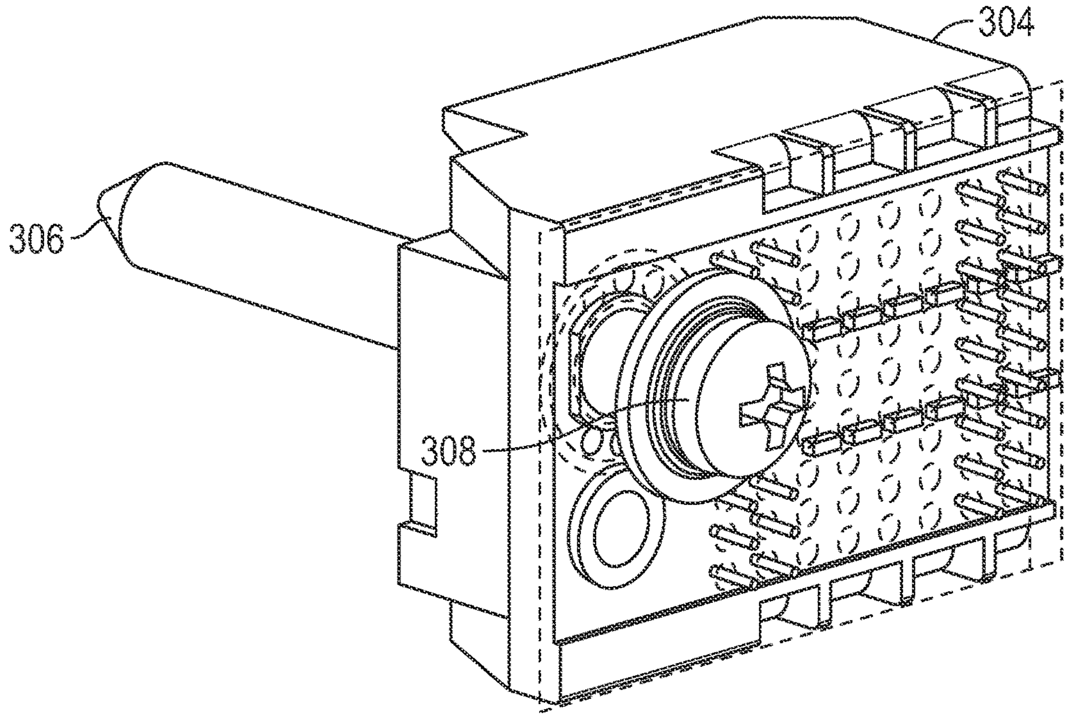

FIGS. 4A through 4D illustrate example portions of the system 100 of FIG. 1A. As seen in FIG. 4A, the backplane connector 304 is attached to the printed circuit board 302. Additionally, the backplane connector 304 includes a guide pin 306 that extends out from the backplane connector 304. The guide pin 306 may be a metallic (e.g., iron) guide pin 306. As seen in FIG. 4B, the backplane connector 304 and the guide pin 306 may be secured to the printed circuit board 302 by a screw 308. The screw 308 may extend through the printed circuit board 302 and the backplane connector 304. The screw 308 may secure the backplane connector 304 to the printed circuit board 302. Additionally, the screw 308 may extend into the guide pin 306 to secure the guide pin 306 to the backplane connector 304 and the printed circuit board 302. As seen in FIG. 4C, the screw 308 may engage a backside of the backplane connector 304. The screw 308 may extend through the backplane connector 304 and into the guide pin 306. In this manner, the screw 308 secures the backplane connector 304 and the guide pin 306 to the printed circuit board 302.

Figure 4D:
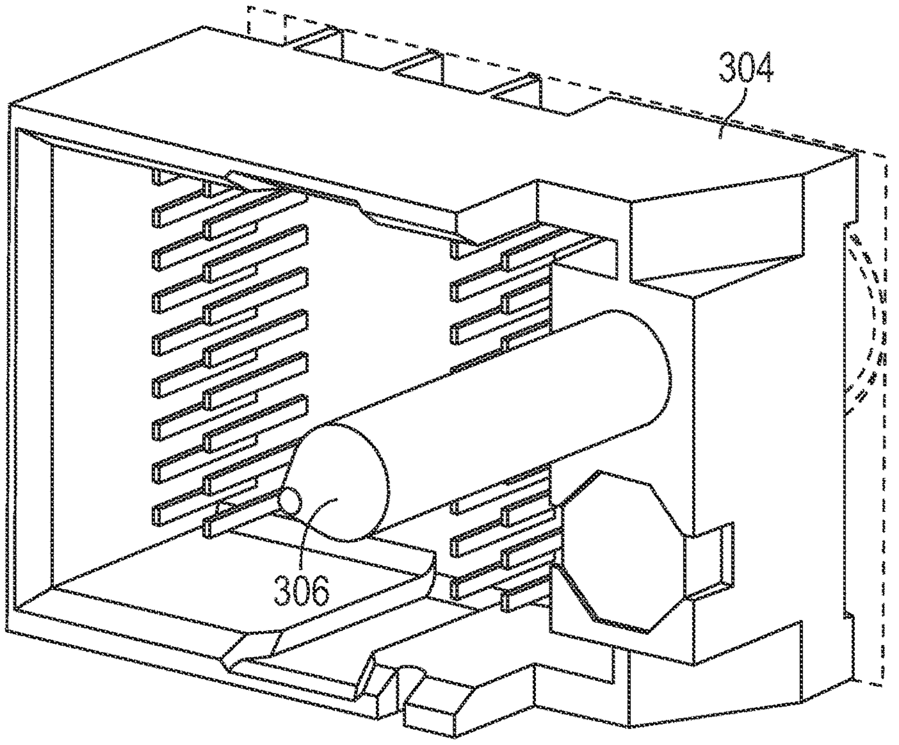

FIG. 4D illustrates another perspective of the backplane connector 304. As seen in FIG. 4D, the backplane connector 304 may include the guide pin 306. The guide pin 306 may extend out of the backplane connector 304. When a line card 104, supervisor card 106, or cover 202 or 220 engages the backplane connector 304, the line card 104, supervisor card 106, or cover 202 or 220 may also engage the guide pin 306. The guide pin 306 may assist in properly aligning the line card 104, supervisor card 106, or cover 202 or 220 with the backplane connector 304. The cover 202 or 220 includes the clip 210 that engages the guide pin 306 when the cover 202 or 220 is positioned in the slot. When a line card 104 or supervisor card 106 engages the backplane connector 304, the guide pin 306 may assist in aligning the line card 104 or supervisor card 106 with the backplane connector 304 so that the proper electrical connections are formed between the backplane connector 304 and the line card 104 or supervisor card 106.

Figure 5A:
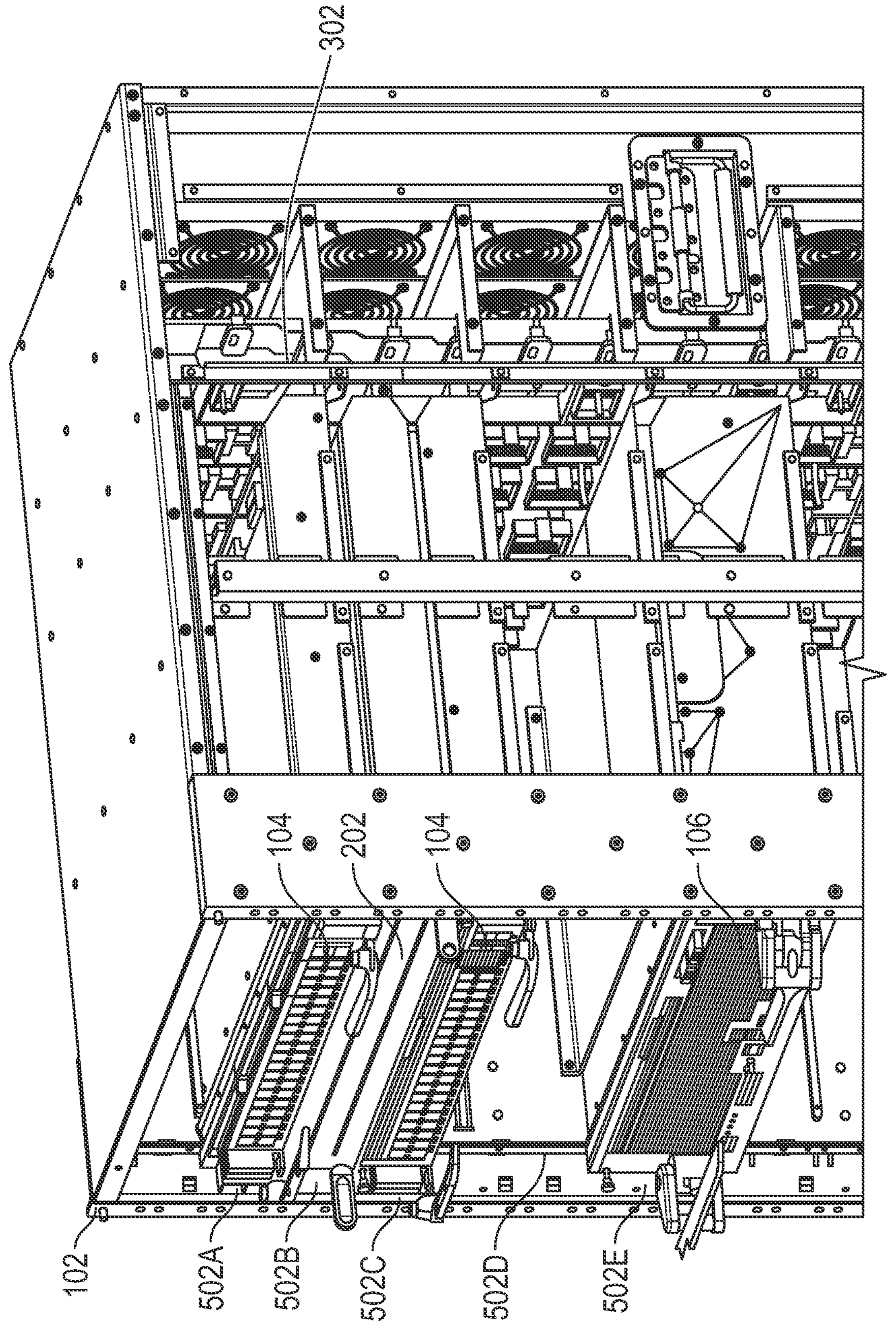
FIGS. 5A and 5B illustrate example portions of the system of FIG. 1A.
Figure 5B:
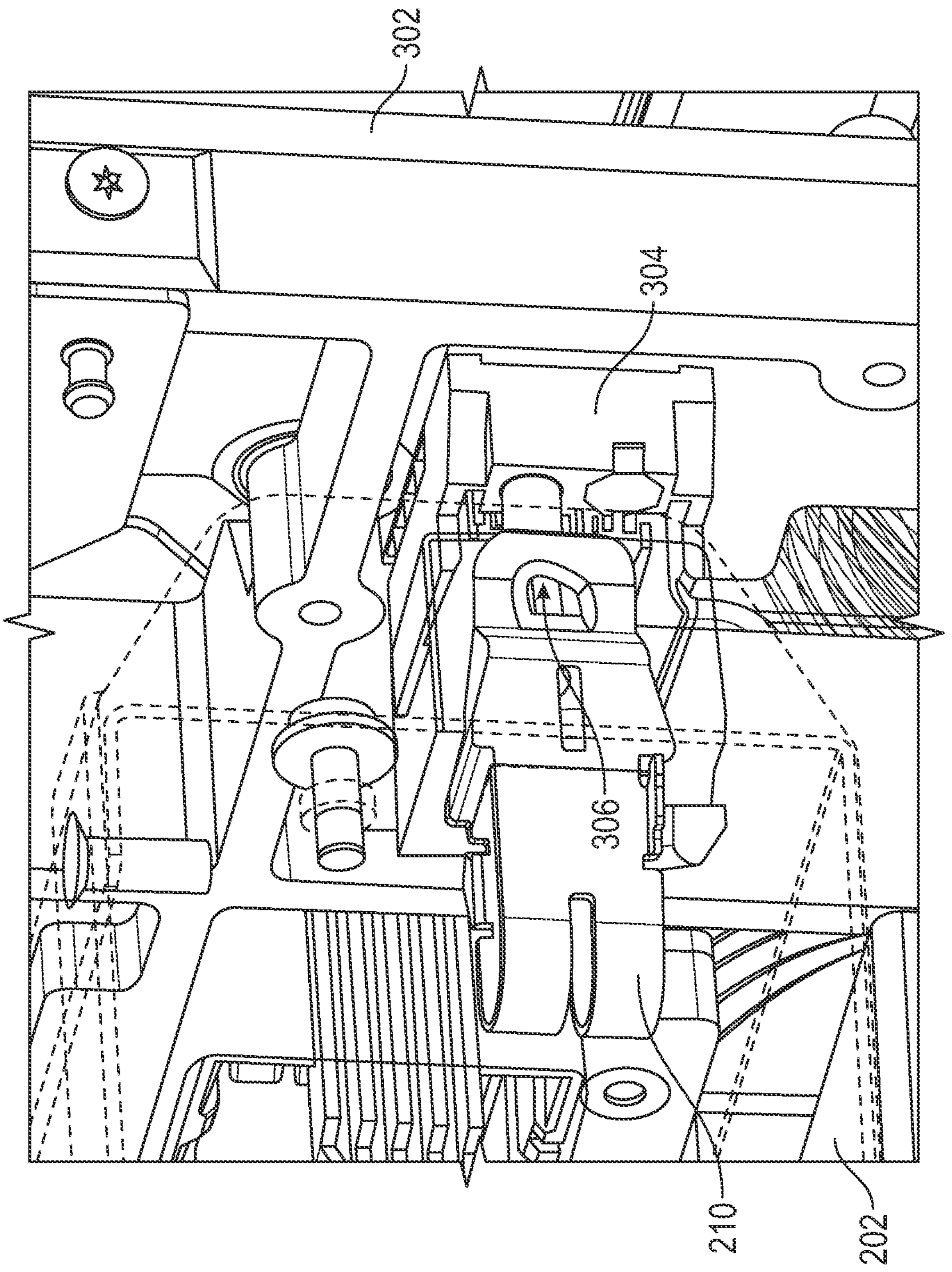

FIGS. 5A and 5B illustrate example portions of the system 100 of FIG. 1A. As seen in FIG. 5A, the chassis 102 includes one or more slots 502. In the example of FIG. 5A, the slots 502A, 502B, and 502C are sized for line cards 104. The slots 502D and 502E are sized for supervisor cards 106. Line cards 104 are positioned in the slots 502A and 502C. Additionally, a supervisor card 106 is positioned in the slot 502E. The printed circuit board 302 is positioned near a backside of the chassis 102. When the line cards 104 and the supervisor card 106 are positioned in the slots 502A, 502C, and 502E, the line cards 104 and the supervisor card 106 engage with the backplane connectors 304 positioned on the printed circuit board 302. The supervisor card 106 may communicate with the line cards 104 through these backplane connectors 304.

Additionally, a cover 202 is positioned in the slot 502B. The cover 202 includes the clip 210 that engages with the guide pin 306 extending from the backplane connector for the slot 502B. The supervisor card 106 may apply an electric voltage to the guide pin 306. When the clip 210 on the cover 202 engages with the guide pin 306, the clip 210 causes a change in voltage or current in the guide pin 306 (e.g., pulls the guide pin 306 to electrical ground). As a result, an electric signal or current flows through the guide pin 306 when the cover 202 is positioned in the slot 502B. When the supervisor card 106 detects the change in voltage or current in the guide pin 306, the supervisor card 106 may determine that the cover 202 is positioned in the slot 502B and that no line card 104 is positioned in the slot 502B.

FIG. 5B shows a view of the backplane connector 304 and the cover 202 in the slot 502B. As seen in FIG. 5B, the printed circuit board 302 and the backplane connector 304 are positioned near a backside of the slot 502B. When the cover 202 is positioned in the slot 502B, the clip 210 on the backside 206 of the cover 202 engages the guide pin 306 extending from the backplane connector 304. The clip 210 may cause a change in voltage or current in the guide pin 306, which causes an electrical signal or current to flow through the guide pin 306 when the supervisor card 106 applies an electrical voltage to the guide pin 306 (e.g., through the backplane connectors 304 for the slots 502B and 502E). When the supervisor card 106 detects the change in voltage or current in the guide pin 306 (e.g., by monitoring the voltage across the guide pin 306), the supervisor card 106 may determine that the cover 202 is positioned in the slot 502B. In some embodiments, a resistor may be coupled in series with the guide pin 306. The resistor may prevent a short circuit when the cover 202 is positioned in the slot 502B.

Figure 6:
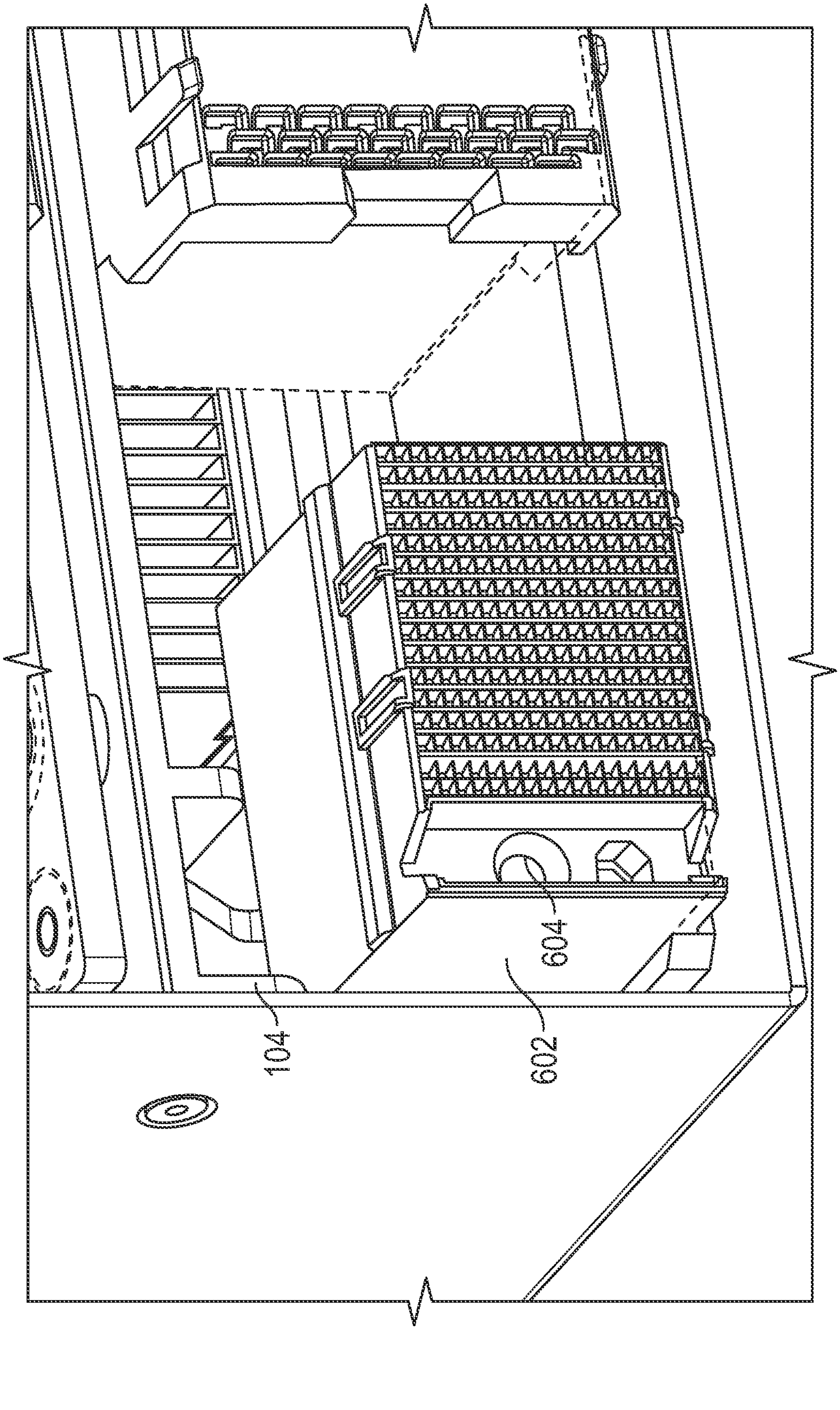
FIG. 6 illustrates an example portion of the system of FIG. 1A.

FIG. 6 illustrates an example portion of the system 100 of FIG. 1A. Generally, FIG. 6 shows the backside of the chassis 102. As seen in FIG. 6, the line card 104 includes a connector 602 near a backside of the line card 104. The connector 602 may engage a backplane connector in a slot of the chassis 102 when the line card 104 is inserted into the slot. The connector 602 may then communicate signals between the line card 104 and a supervisor card 106 through the backplane connector. Additionally, as seen in FIG. 6, the connector 602 defines a cavity 604. The cavity 604 may receive or engage the guide pin extending from the backplane connector. As a result, the cavity 604 and the guide pin align the connector 602 and the line card 104 with the backplane connector. In certain embodiments, the portion of the connector 602 that forms the cavity 604 may be formed using a plastic material or another electrically non-conducting material. As a result, then the cavity 604 receives or engages the guide pin, the connector 602 may not cause a change in voltage or current in the guide pin (e.g., does not pull the guide pin to ground). When a supervisor card applies electric voltage to the guide pin, no electric signal or current may flow through the guide pin due to the plastic or other non-conducting material engaging the guide pin. When the supervisor card determines that no electric signal or current is flowing through the guide pin, the supervisor card may determine that a cover 202 or 220 is not positioned in the slot 502.

Figure 7:
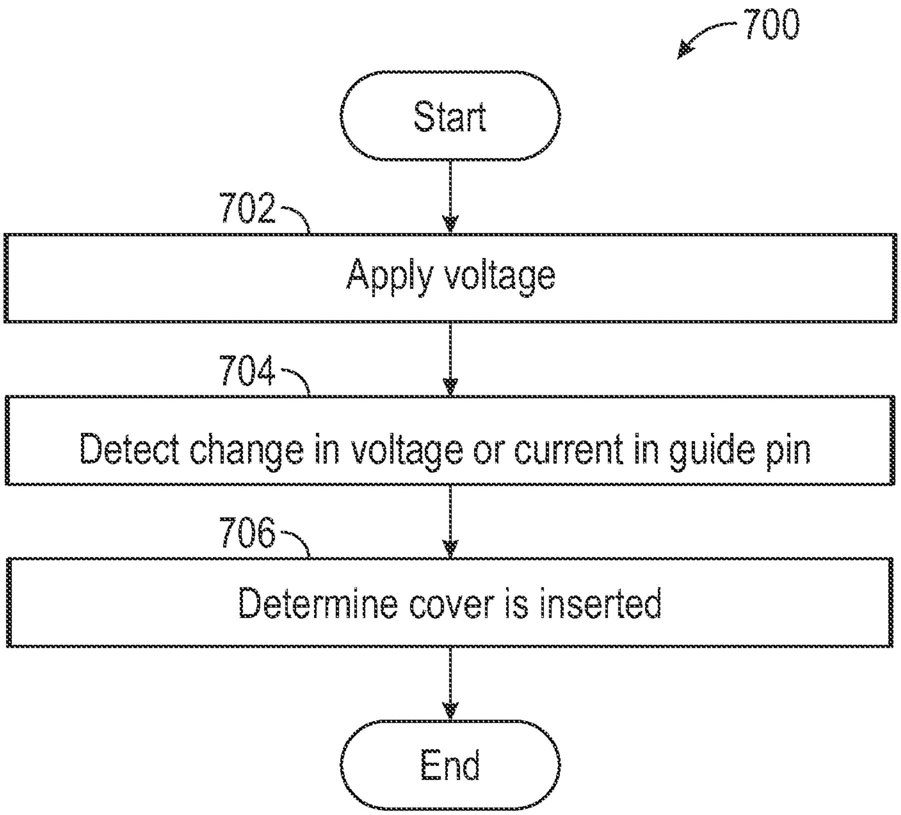
FIG. 7 is a flowchart of an example method performed by the system of FIG. 1A.

FIG. 7 is a flowchart of an example method 700 performed by the system 100 of FIG. 1A. In particular embodiments, a supervisor card 106 in a chassis 102 may perform the method 700. By performing the method 700, the supervisor card 106 detects when a cover 202 or 220 is positioned in a slot 502 of the chassis 102.

In block 702, the supervisor card 106 applies a voltage to a guide pin 306 of a backplane connector 304 for a slot 502 in the chassis 102. The supervisor card 106 may be connected to a backplane connector 304 that is connected to the backplane connector 304 for the slot 502 (e.g., through the printed circuit board 302). The supervisor card 106 may apply the electric voltage through the backplane connectors 304 into the guide pin 306.

In block 704, the supervisor card 106 detects a change in voltage or current in the guide pin 306 (e.g., detect that the guide pin 306 is pulled to electrical ground). Generally, when a line card 104 is positioned in the slot 502, the line card 104 may engage the guide pin 306 with a plastic or other non-conducting material. As a result, no change in voltage or current in the guide pin 306 occurs. On the other hand, when a cover 202 or 220 is positioned in the slot 502, the metal clip 210 on the cover 202 or 220 engages the guide pin 306, which causes a change in voltage or current in the guide pin 306 (e.g., pulls the guide pin 306 to electrical ground). As a result, an electric current flows through the guide pin 306 when the supervisor card 106 applies the electric voltage to the guide pin 306.

In block 706, the supervisor card 106 determines that the cover 202 and 220 is inserted in the slot 502 when the supervisor card 106 determines the change in voltage or current in the guide pin 306. The supervisor card 106 may then log that the slot 502 is unused.

In summary, a supervisor card 106 uses guide pins 306 in a chassis 102 to determine whether covers 202 or 220 are inserted in slots 502 in the chassis 102. For example, the supervisor card 106 may apply an electric voltage to the guide pins 306 on the backplane connectors 304 in the chassis 102. A cover 202 or 220 may include a metal clip 210 that engages a guide pin 306 when the cover 202 or 220 is inserted in a slot 502. The metal clip 210 may cause a change in voltage or current in the guide pin 306 (e.g., pulls the guide pin 306 to ground and causes an electric current to flow through the guide pin 306). When the supervisor card 106 detects the change in voltage or current in the guide 306, the supervisor card 106 may determine that a cover 202 or 220 is inserted in the slot 502. If, on the other hand, a line card 104 were inserted in the slot 502, the line card 104 may not include the metal clip 210 that engages the guide pin 306. As a result, when the line card 104 is inserted in the slot 502, the line card 104 may not cause a change in voltage or current in the guide pin 306. The supervisor card 106 may determine that the cover 202 or 220 is not inserted in the slot 502 when the supervisor card 106 does not detect a change in voltage or current in the guide pin 306.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
- a backplane connector positioned in a slot on a chassis;
- a guide pin coupled to the backplane connector;
- a cover comprising a metal clip, wherein the metal clip is arranged to engage the guide pin when the cover is inserted into the slot; and
- a processor electrically coupled to the guide pin, wherein the processor is configured to:
  - apply a voltage to the guide pin; and
  - determine that the cover is inserted into the slot based on a change in voltage or current in the guide pin.

2. The system of claim 1, wherein the metal clip pulls the guide pin to electrical ground when the metal clip engages the guide pin.

3. The system of claim 1, further comprising a line card comprising a plastic connector arranged to engage the guide pin when the line card is inserted into the slot.

4. The system of claim 1, further comprising a printed circuit board, wherein the backplane connector is attached to the printed circuit board.

5. The system of claim 4, further comprising a screw that attaches (i) the guide pin to the backplane connector and (ii) the backplane connector to the printed circuit board.

6. The system of claim 1, wherein the backplane connector is positioned on a backside of the chassis, and wherein the cover is arranged to insert into the slot through a front side of the chassis opposite the backside.

7. The system of claim 1, wherein the clip is coupled to a backside of the cover, and wherein the backside of the cover defines a plurality of cavities.

8. The system of claim 1, wherein determining that the cover is inserted into the slot is based on an electric current flowing through the guide pin.

9. A method comprising:
- applying a voltage to a guide pin coupled to a backplane connector positioned in a slot on a chassis; and
- determining that a cover comprising a metal clip is inserted into the slot based on a change in voltage or current in the guide pin, wherein the metal clip engages the guide pin when the cover is inserted into the slot.

10. The method of claim 9, wherein the metal clip pulls the guide pin to electrical ground when the metal clip engages the guide pin.

11. The method of claim 9, wherein a line card comprising a plastic connector that engages the guide pin when the line card is inserted into the slot.

12. The method of claim 9, wherein the backplane connector is attached to a printed circuit board.

13. The method of claim 12, wherein a screw attaches (i) the guide pin to the backplane connector and (ii) the backplane connector to the printed circuit board.

14. The method of claim 9, wherein the backplane connector is positioned on a backside of the chassis, and wherein the cover is arranged to insert into the slot through a front side of the chassis opposite the backside.

15. The method of claim 9, wherein the clip is coupled to a backside of the cover, and wherein the backside of the cover defines a plurality of cavities.

16. A system comprising:
- a first guide pin positioned in a first slot on a chassis;
- a second guide pin positioned in a second slot on the chassis;
- a cover comprising a metal clip, wherein the cover is inserted into the first slot such that the metal clip engages the first guide pin;
- a line card comprising a plastic connector, wherein the line card is inserted into the second slot such that the plastic connector engages the second guide pin; and
- a processor electrically coupled to the first guide pin and the second guide pin, wherein the processor is configured to:
  - apply a voltage to the first guide pin and the second guide pin; and
  - determine that the cover is inserted into the first slot rather than the second slot based on a change in voltage or current in the first guide pin.

17. The system of claim 16, wherein the metal clip pulls the first guide pin to electrical ground when the metal clip engages the first guide pin.

18. The system of claim 16, further comprising backplane connector coupled to the first guide pin and the second guide pin.

19. The system of claim 18, further comprising a printed circuit board, wherein the backplane connector is attached to the printed circuit board.

20. The system of claim 19, further comprising a screw that attaches (i) the first guide pin to the backplane connector and (ii) the backplane connector to the printed circuit board.

* * * * *